US011895542B2

(12) United States Patent
Viering et al.

(10) Patent No.: US 11,895,542 B2
(45) Date of Patent: Feb. 6, 2024

(54) REDUCING HANDOVER INTERRUPTION WITH TWO TRANSMITTERS AND RECEIVERS

(71) Applicant: Nokia Technologies Oy, Espoo (FI)

(72) Inventors: Ingo Viering, Munich (DE); Jedrzej Stanczak, Wroclaw (PL); Ahmad Awada, Munich (DE); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 478 days.

(21) Appl. No.: 17/281,098

(22) PCT Filed: Oct. 10, 2019

(86) PCT No.: PCT/FI2019/050722
§ 371 (c)(1),
(2) Date: Mar. 29, 2021

(87) PCT Pub. No.: WO2020/089511
PCT Pub. Date: May 7, 2020

(65) Prior Publication Data
US 2021/0345196 A1 Nov. 4, 2021

Related U.S. Application Data

(60) Provisional application No. 62/754,474, filed on Nov. 1, 2018.

(51) Int. Cl.
*H04W 36/08* (2009.01)
*H04W 36/18* (2009.01)
(Continued)

(52) U.S. Cl.
CPC ... *H04W 36/0077* (2013.01); *H04W 36/0058* (2018.08); *H04W 36/08* (2013.01); *H04W 36/18* (2013.01); *H04W 74/0833* (2013.01)

(58) Field of Classification Search
None
See application file for complete search history.

(56) References Cited

U.S. PATENT DOCUMENTS

2015/0350969 A1\* 12/2015 Dudda .............. H04W 36/0055
370/331
2016/0262066 A1 9/2016 Ozturk et al.
(Continued)

FOREIGN PATENT DOCUMENTS

KR 1020180028896 A 3/2018
WO 2017/185923 A1 11/2017
(Continued)

OTHER PUBLICATIONS

Extended European Search Report received for corresponding European Patent Application No. 19879316.8, dated Mar. 4, 2022, 22 pages.
(Continued)

*Primary Examiner* — Duc T Duong
(74) *Attorney, Agent, or Firm* — Nokia Technologies Oy

(57) ABSTRACT

A technique of performing a HO includes the source BS sending a HO resume message to the UE at the conclusion of a RACH access procedure that occurs in response to a HO command while a second TRX of the UE continues to exchange data packets with the source BS as if no HO command were issued. By continuing to exchange data with the source BS as if there were no HO command until the HO resume message reintroduces a RACH-less HO procedure, the interruption may be reduced to about 4 msec. At any point in time the UE handles only one protocol stack and only one security, which avoids the complexity of the advanced prior art methods.

20 Claims, 7 Drawing Sheets

(51) Int. Cl.
*H04W 36/38* (2009.01)
*H04W 74/08* (2009.01)
*H04W 36/00* (2009.01)

(56) References Cited

U.S. PATENT DOCUMENTS

| | | | |
|---|---|---|---|
| 2018/0020382 A1 | 1/2018 | Kim et al. | |
| 2018/0098250 A1 | 4/2018 | Vrzic et al. | |
| 2018/0227819 A1* | 8/2018 | Lee | H04W 36/0016 |
| 2018/0279186 A1* | 9/2018 | Park | H04W 36/30 |
| 2018/0338271 A1* | 11/2018 | Park | H04W 36/0077 |
| 2019/0037457 A1* | 1/2019 | Jang | H04W 74/08 |
| 2019/0223073 A1* | 7/2019 | Chen | H04W 36/365 |
| 2019/0297537 A1* | 9/2019 | Tsai | H04W 36/0016 |
| 2020/0022035 A1* | 1/2020 | Kadiri | H04W 36/0072 |
| 2021/0321298 A1* | 10/2021 | Keskitalo | H04W 36/36 |
| 2021/0345191 A1* | 11/2021 | Da Silva | H04W 36/00837 |
| 2022/0030483 A1* | 1/2022 | Cheng | H04W 76/30 |
| 2022/0116839 A1* | 4/2022 | Tseng | H04W 36/36 |

FOREIGN PATENT DOCUMENTS

| | | |
|---|---|---|
| WO | 2018/059299 A1 | 4/2018 |
| WO | 2018/186721 A1 | 10/2018 |

OTHER PUBLICATIONS

"Common Security framework for Resume and Re-establishment", 3GPP TSG-RAN WG2#101, R2-1803430, Agenda item: 10.4.1.7.6, Samsung, Feb. 26-Mar. 2, 2018, 5 Pages.

"3rd Generation Partnership Project; Technical Specification Group Radio Access Network; Study on Self Evaluation towards IMT-2020 Submission (Release 15)", 3GPP TR 37.910, V0.1.0, Mar. 2018, pp. 1-24.

"Discussion for Simultaneous Connectivity Handover", 3GPP TSG RAN WG2 Meeting #103bis, R2-1814054, Agenda : 12.3.3, Intel Corporation, Oct. 8-12, 2018, pp. 1-4.

"Report of the Email Discussion on the 0ms Handover Interruption Time Requirement from IMT2020", 3GPP TSG-RAN WG2#101, R2-1802401, Agenda : 4.1, ZTE Corporation, Feb. 26-Mar. 2, 2018, 19 pages.

"The Analysis of LTE Mobility Interruption and Possible Enhancement Directions", 3GPP TSG-RAN WG2 Meeting #103bis, R2-1814460, Agenda : 12.3.2, Nokia, Oct. 8-12, 2018, 4 pages.

"Alternative Handover Procedure with Close-to-zero ms Interruption", 3GPP TSG-RAN WG2 Meeting #104, R2-18xxxxx, Agemda : 12.3.2, Nokia, Nov. 12-16, 2018, 6 pages.

"3rd Generation Partnership Project; Technical Specification Group Radio Access Network; Evolved Universal Terrestrial Radio Access (E-UTRA); Radio Resource Control (RRC);Protocol specification (Release 15)", 3GPP TS 36.331, V15.3.0, Sep. 2018, pp. 1-918.

"3rd Generation Partnership Project; Technical Specification Group Radio Access Network; NR; Radio Resource Control (RRC) protocol specification (Release 15)", 3GPP TS 38.331, V15.3.0, Sep. 2018, pp. 1-445.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321, V15.3.0, Sep. 2018, pp. 1-127.

"3rd Generation Partnership Project; Technical Specification Group Radio Access Network; NR;Medium Access Control (MAC) protocol specification(Release 15)", 3GPP TS 38.321, V15.3.0, Sep. 2018, pp. 1-76.

"3rd Generation Partnership Project; Technical Specification Group Radio Access Network; Evolved Universal Terrestrial Radio Access Network (E-UTRAN); X2 application protocol (X2AP)(Release 15)", 3GPP TS 36.423, V15.3.0, Sep. 2018, pp. 1-401.

"3rd Generation Partnership Project; Technical Specification Group Radio Access Network; NG-RAN; Xn application protocol (XnAP) (Release 15)", 3GPP TS 38.423, V15.1.0, Sep. 2018, pp. 1-263.

"Non-split Bearer Solution for Reducing Service Interruption Time", 3GPP TSG-RAN WG2 Meeting #104, R2-1xxxxxx, Agenda : 12.3.2, Nokia, Nov. 12-16, 2018, 8 pages.

International Search Report and Written Opinion received for corresponding Patent Cooperation Treaty Application No. PCT/FI2019/050722, dated Jan. 15, 2020, 15 pages.

Viering et al., "Zero-Zero Mobility: Intra-Frequency Handovers with Zero Interruption and Zero Failures", IEEE Network, vol. 32, No. 2, Mar.-Apr. 2018, pp. 48-54.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300, V14.8.0, Sep. 2018, pp. 1-331.

* cited by examiner

REDUCING HANDOVER INTERRUPTION WITH TWO TRANSMITTERS AND RECEIVERS

RELATED APPLICATION

This application was originally filed as PCT Application No. PCT/FI2019/050722 on Oct. 10, 2019, which claims priority from U.S. Provisional Application No. 62/754,474 filed Nov. 1, 2018, each of which is incorporated herein by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/ s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a user equipment (UE) having a first transceiver (TRX) and a second TRX, a handover (HO) command from a source base station (BS); after receiving the HO command, performing, by the UE, a random access channel (RACH) access operation in which configuration information is shared between the UE and a target BS using the second TRX, the RACH access operation being performed while the UE exchanges data packets with the source BS using the first TRX; and after completing the performing of the RACH access operation, receiving, by the UE, a HO resume message from the source BS.

According to an example implementation, an apparatus includes at least memory and controlling circuitry coupled to the memory, the controlling circuitry being configured to receive a handover (HO) command from a source base station (BS); after receiving the HO command, perform a random access channel (RACH) access operation in which configuration information is shared between the UE and a target BS using a second TRX, the RACH access operation being performed while the UE exchanges data packets with the source BS using a first TRX; and after completing the performing of the RACH access operation, receive a HO resume message from the source BS.

According to an example implementation, an apparatus includes means for receiving a handover (HO) command from a source base station (BS); means for performing, after receiving the HO command, a random access channel (RACH) access operation in which configuration information is shared between the UE and a target BS using a second TRX, the RACH access operation being performed while the UE exchanges data packets with the source BS using a first TRX; and means for receiving a HO resume message from the source BS after completing the performing of the RACH access operation.

According to an example implementation, a computer program product includes a computer-readable storage medium and storing executable code that, when executed by at least one data processing apparatus, is configured to cause the at least one data processing apparatus to perform a method including receiving a handover (HO) command from a source base station (BS); after receiving the HO command, performing a random access channel (RACH) access operation in which configuration information is shared between the UE and a target BS using a second TRX, the RACH access operation being performed while the UE exchanges data packets with the source BS using a first TRX; and after completing the performing of the RACH access operation, receiving a HO resume message from the source BS.

According to an example implementation, a method includes sending, by a source base station (BS), a handover (HO) command to a user equipment (UE); after sending the HO command, exchanging, by the source BS, data packets with the UE; after sending the HO command, receiving, by the source BS, a random access channel (RACH) access complete notification that a RACH access operation in which configuration information is shared between the UE and a target BS has completed, the RACH access operation having been performed by the UE after the UE receives the HO command; and after receiving the RACH complete notification, sending, by the source BS, a HO resume message to the UE.

According to an example implementation, an apparatus at a first node of an asynchronous wireless network includes at least memory and controlling circuitry coupled to the memory, the controlling circuitry being configured to send a handover (HO) command to a user equipment (UE); after sending the HO command, exchange data packets with the UE; after sending the HO command, receive a random access channel (RACH) access complete notification that a RACH access operation in which configuration information is shared between the UE and a target BS has completed, the RACH access operation having been performed by the UE after the UE receives the HO command; and after receiving the RACH complete notification, send a HO resume message to the UE.

According to an example implementation, an apparatus includes means for sending a handover (HO) command to a user equipment (UE); means for exchanging, data packets with the UE after sending the HO command; means for receiving, after sending the HO command, a random access channel (RACH) access complete notification that a RACH access operation in which configuration information is shared between the UE and a target BS has completed, the RACH access operation having been performed by the UE after the UE receives the HO command; and means for sending a HO resume message to the UE after receiving the RACH complete notification.

According to an example implementation, a computer program product includes a computer-readable storage medium and storing executable code that, when executed by at least one data processing apparatus, is configured to cause the at least one data processing apparatus to perform a method including sending a handover (HO) command to a user equipment (UE); after sending the HO command, exchanging data packets with the UE; after sending the HO command, receiving a random access channel (RACH) access complete notification that a RACH access operation in which configuration information is shared between the UE and a target BS has completed, the RACH access operation having been performed by the UE after the UE receives the HO command; and after receiving the RACH complete notification, sending a HO resume message to the UE.

The details of one or more examples of implementations are set forth in the accompanying drawings and the description below. Other features will be apparent from the description and drawings, and from the claims.

DETAILED DESCRIPTION

Figure 1A:
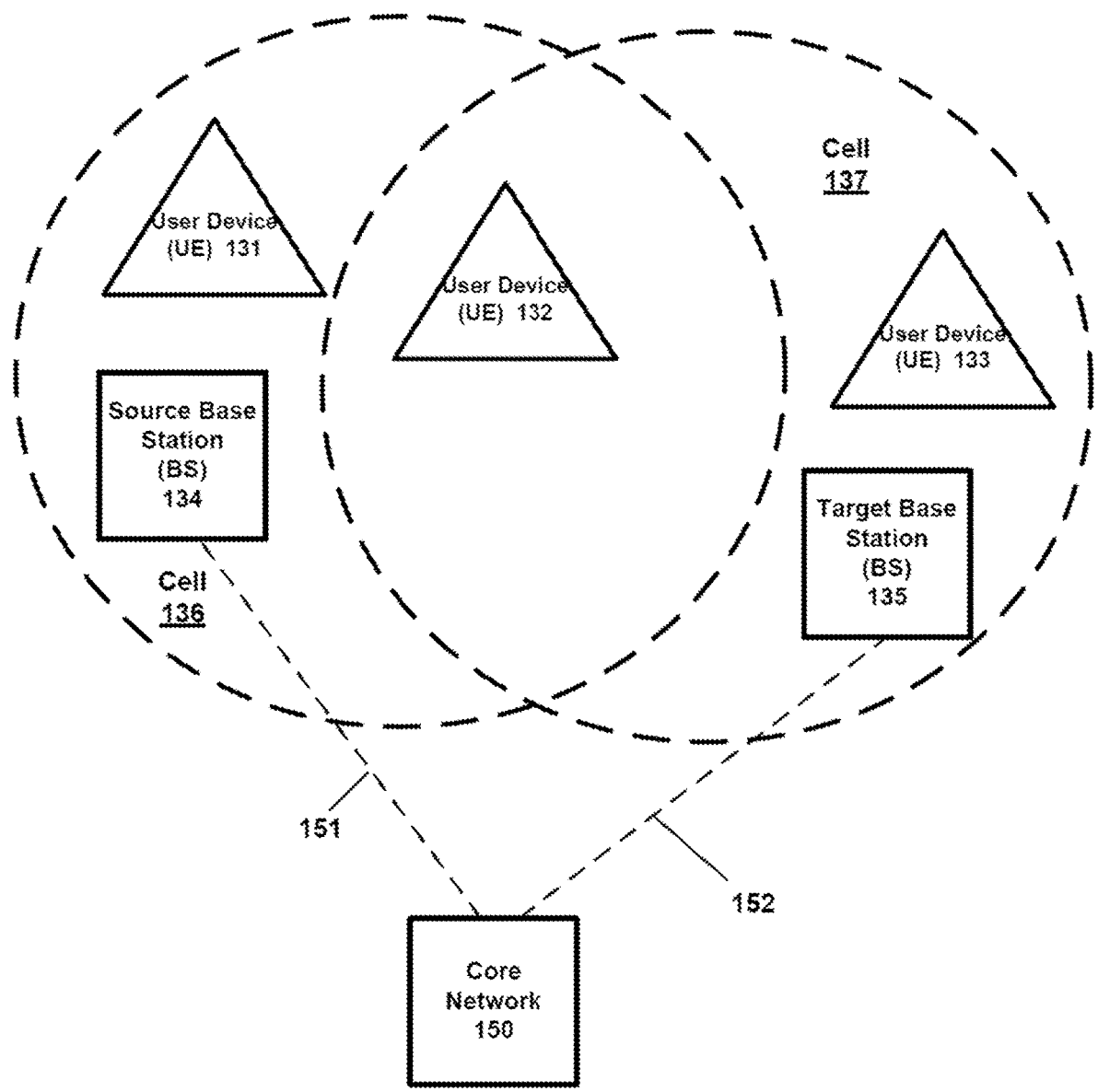
FIG. 1A is a block diagram of a wireless network according to an example implementation.

FIG. 1A is a block diagram of a wireless network 130 according to an example implementation. In the wireless network 130 of FIG. 1A, user devices 131, 132 and 133, which may also be referred to as mobile stations (MSs) or user equipment (UEs), may be connected (and in communication) with either of base stations (BS) 134 and 135, each of which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BSs (or APs) 134 and 135 provide wireless coverage within respective cells 136 and 137, including to user devices 131 and 132 from BS 134 and user device 133 from BS 135. Although only one or two user devices are shown as being connected or attached to BSs 134 and 135, any number of user devices may be provided. BS 134 and BS 135 are also connected to a core network 150 via respective interfaces 151 and 152. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), enhanced mobile broadband, massive machine type communications (MMTC), vehicle-to-vehicle (V2V), vehicle-to-device, etc. Each of these use cases, or types of UEs, may have its own set of requirements.

Some handover (HO) operations in LTE result in an interruption; that is, a period of time during which a UE cannot exchange data packets with a network. During this interruption, the data packets are stored in a Packet Data Convergence Protocol (PDCP) service data unit (SDU) buffer.

Such an interruption may be caused by the various processes involved in HO. Examples of such processes include the detection of a radio resource control (RRC) Connection Reconfiguration, a sequence number (SN) status transfer, a target cell search, UE processing time for radio frequency (RF)/baseband retuning and security update, a delay to acquire a first available physical random access channel (PRACH) in a target eNB, a PRACH preamble transmission, an uplink (UL) allocation and timing advance (TA) for the UE, and a RRC Connection Reconfiguration Complete sent by the UE.

An objective in LTE and NR networks is to reduce the interruption HO operations to as small a time period as possible. Table 1 illustrates some interruption times for various conventional HO techniques.

TABLE 1

Interruption times for various conventional HO techniques.

| Description | Time (ms) | Time (ms) (sameBW) | MBB | MBB + RACHless |
|---|---|---|---|---|
| RRC Connection Reconfiguration Incl. mobilityControlInfo | 15 | 15 | 0 | 0 |
| SN Status Transfer | 0 | 0 | 0 | 0 |
| Target cell search | 0 | 0 | 0 | 0 |
| UE processing time for RF/baseband re-tuning, security update | 20 | 5 | 5 | 5 |
| Delay to acquire first available PRACH in target eNB | 0.5/2.5 | 0.5/2.5 | 0.5/2.5 | 0 |
| PRACH preamble transmission | 1 | 1 | 1 | 0 |
| UL Allocation + TA for UE | 3/5 | 3/5 | 3/5 | 0 |
| UE sends RRC Connection Reconfiguration Complete | 6 | 6 | 6 | 6 |
| Minimum/Typical Total delay [ms] | 45.5/49.5 | 30.5/44.5 | 15.5/19.5 | 11 |

The legacy approaches to HO are summarized in the first column, in which the net interruption time is about 45 milliseconds (msec). Many services cannot tolerate such an interruption, e.g. ultra-reliable low latency services, or diverse industrial applications. Therefore, it is desirable to develop methods which reduce this interruption. For example, by requiring that the target cell has the same bandwidth and the same carrier frequency than the source cell, the UE processing time reduces to ~5 msec and the net interruption time is reduced to about 30 msec. Interruption times may be reduced further by using make-before-break (MBB) HO.

In the legacy handover, the source BS 134 will stop the data transmission when it sends out the handover command Hence, the UE 132 will no longer receive any downlink data or uplink grants, although it will take some time until the UE 132 has processed the RRC reconfiguration and starts with retuning to the new cell. In principle, even with a single transmitter, data transmission could continue during that period.

To this end, MBB HO specifies that the source BS 134 will continue data transmission even after sending out the HO Command Such a change may save ~15 msec. Unfortunately, MBB HO has some uncertainty. For example, it is not specified how long the source BS 134 would continue transmission and when it stops. The source BS 134 does not know when exactly the UE 135 will leave, i.e. when the UE will stop listening. Note that Table 1 lists approximate values for the individual steps, as the exact value depends on the terminal implementation. Furthermore, MBB may still leave some components of the interruption, in particular the RACH procedure, as shown in Table 1 because the interruption time is about 15-20 msec.

In addition, the RACH procedure may be significantly simplified, or even entirely saved, under certain circumstances, which are:

Extremely small cells, where timing advance is (almost) 0 msec. This case is also called synchronized networks.

Source cell and target cell have co-located antennas. In this case, the timing advance for source and target cell can be assumed to be the same, i.e. the UE 132 would continue with the timing advance of the source cell.

Note that further circumstances have been proposed, e.g. it was proposed that the UE derives the target's timing advance from the source's timing advance and time difference between source and target downlink reference signals.

RACH-less handover can be combined with MBB and achieves a service interruption in the range of 11 msec. This HO operation is summarized in FIG. 1B.

Figure 1B:
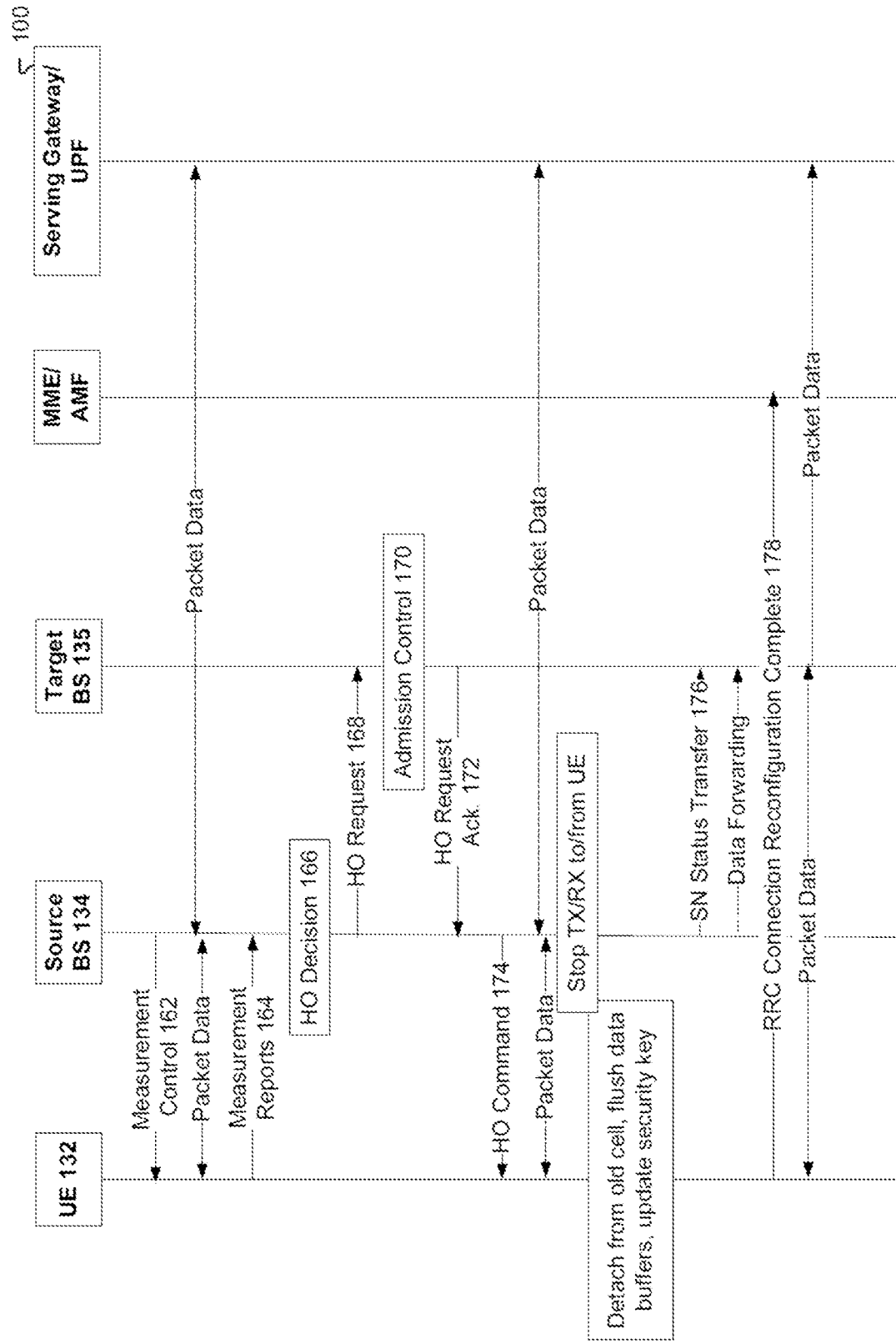
FIG. 1B is a sequence diagram illustrating a make-before-break and RACH-less handover (HO).

FIG. 1B is a sequence diagram illustrating a make-before-break and RACH-less handover (HO) operation 100. At 162, the source BS 134 performs a measurement control which induces the UE 132 to perform measurements of, for example, signal strength, etc., in the context of deciding whether the UE is in the correct cell. In the meantime, the source BS 134 and the UE 132 exchange packet data that the BS 134 receives from a Serving Gateway/UPF.

At 164, the UE 132 generates and sends a measurement report to the source BS 134. The measurement report indicates measurements of, for example, signal strength. At 166, the source BS 134 makes a decision regarding performing a HO with the target BS based on the measurements included in the measurement report.

At 168, in the case where the source BS decides to perform a HO operation, the source BS 134 sends a HO request to the target BS 135. After receiving the HO request, at 170 the target BS 135 performs an admission control operation to determine whether to serve the UE 132 in the cell 137. At 172, in the case where the target BS 135 admits the UE 132, the target BS 135 sends a HO request acknowledgment to the source BS 134.

At 174, after receiving the HO request acknowledgement, the source BS 134 sends a HO command to the UE 132. After receiving the HO command, data transmission may continue for some time, which may be uncertain, following the MBB principle, but immediately after decoding the HO Command, the UE 132 detaches from the source cell,
flushes its buffers,
updates the security key, and
sends the RRC Connection Reconfiguration Complete message to the target BS 135.
The RRC Connection Reconfiguration Complete message is sent without a RACH directly, whereas the grant may be conveyed with the HO command, or the UE 132 waits for being scheduled in the target. In the meantime, the source BS ceases TX/RX to/from the UE 132.

At 176, after the source BS 134 sends a HO command to the UE 132, the source BS performs a sequence number (SN) status transfer to the target BS 135 and begins forwarding data packets to the target BS 135. Then, at 178, the UE sends a RRC Connection Reconfiguration Complete message 178. Once this message has been sent, the UE 132 and the target BS 135 exchange data packets.

The application of RACH-less handover is limited to the aforementioned cases which is quite restrictive. It is desirable to have a solution also for larger cells which do not have co-located antennas. Furthermore, it is desirable to further reduce the 11 ms.

One solution extends the MBB idea with 2 TRX. The assumption is that the full protocol stack is established at the target cell (including PDCP layer). In order to completely avoid any interruption, the UE communicates with both PDCP layer, i.e. with two different security keys at the same time. Furthermore, in the uplink, the packets received by the two PDCPs may be re-ordered, and duplicates may be removed.

These solutions have been shown to lead to extremely sophisticated solutions. Due to the short time frame for the work items in 3GPP, there is limited probability that RAN2 can agree on such a solution. Furthermore, those solutions might get complex, so terminal vendors may be negative against those. Finally, RAN has to be significantly involved for those solutions which further make it difficult to be agreed.

Other proposals suggest to adapt the "dual connectivity" principle well-known from Rel12. The idea is to set up a split bearer together with the target cell. For those solutions, at some point the PDCP (and the RRC) layer may be re-located from the source to the master cell (called "role swap", or "role change"). This involves changing the security key from source to target cell. It is still unclear how this relocation could be done without any interruption.

In contrast to the conventional approaches to performing a HO as described above, improved techniques of performing a HO includes the source eNB sending a HO resume message to the UE at the conclusion of a RACH access procedure that occurs in response to a HO command while a second TRX of the UE continues to exchange data packets with the source eNB as if no HO command were issued. By continuing to exchange data with the source eNB as if there were no HO command until the HO resume message reintroduces a RACH-less HO procedure, the interruption may be reduced to about 4 msec. At any point in time the UE handles only one protocol stack and only one security, which avoids the complexity of the advanced prior art methods.

To maintain the simplicity of the improved techniques, one may not achieve exactly 0ms interruption that many proposals have addressed. Instead, a HO operation is proposed which is at least as good as the MBB+RACH-less HO operation described in FIG. 1B, but which does not have the restriction of extremely small cells or co-located antennas, and the uncertainties related to the detach of the UE from source BS or to the time instant that the source BS stops transmitting/receiving to/from the UE. The improved techniques may work between any cells, but uses the assumption that the UE 132 has two transceivers (TRX).

In principle, the improved techniques are based on a RACH-less handover. When the UE 132 receives and detects the handover command (with a new indication that it will be RACH-less handover with 2 TRX), it will use a second TRX to retune the RF and perform the RACH procedure with the target cell. During this period, it will preliminarily continue the transmission with the source as if no handover command has been received.

RACH-less handover procedure is suspended after the reception of the HO command until the RACH procedure is completed. When the RACH procedure is completed and the target cell is active (with the second TRX), the source BS 134 will send a short and simple HO resume message to the UE 132. When the UE 132 receives this HO resume, it can continue the RACH-less handover procedure as today (potentially with further modifications), since the timing advance is now available, and furthermore, even all the MAC procedures are already established. This HO resume can include a very small amount of data, since all relevant information has been sent beforehand in the Handover Command. In some implementations, the HO resume message may be a lower layer message to accelerate the detection on the UE side.

From the perspective of the source BS 134, the source BS 134 will continue the transmission after sending the HO Command. At some point the source BS 134 will receive a notification from the target BS 135 (or from the UE 132) that the target BS 135 is up and running. Then, the source BS 134 will also resume the handover procedure very similar to today:

Send the Handover Resume message to the UE (instead of the full HO Command).
Start Packet Forwarding
Stop transmission/reception to/from UE.

Note that there will still be some interruption in the range of several milliseconds. It can be further enhanced by some further aspects of the improved techniques as explained below, but 0 msec can not be achieved with this solution. The strength of this approach is its simplicity.

Figure 2:
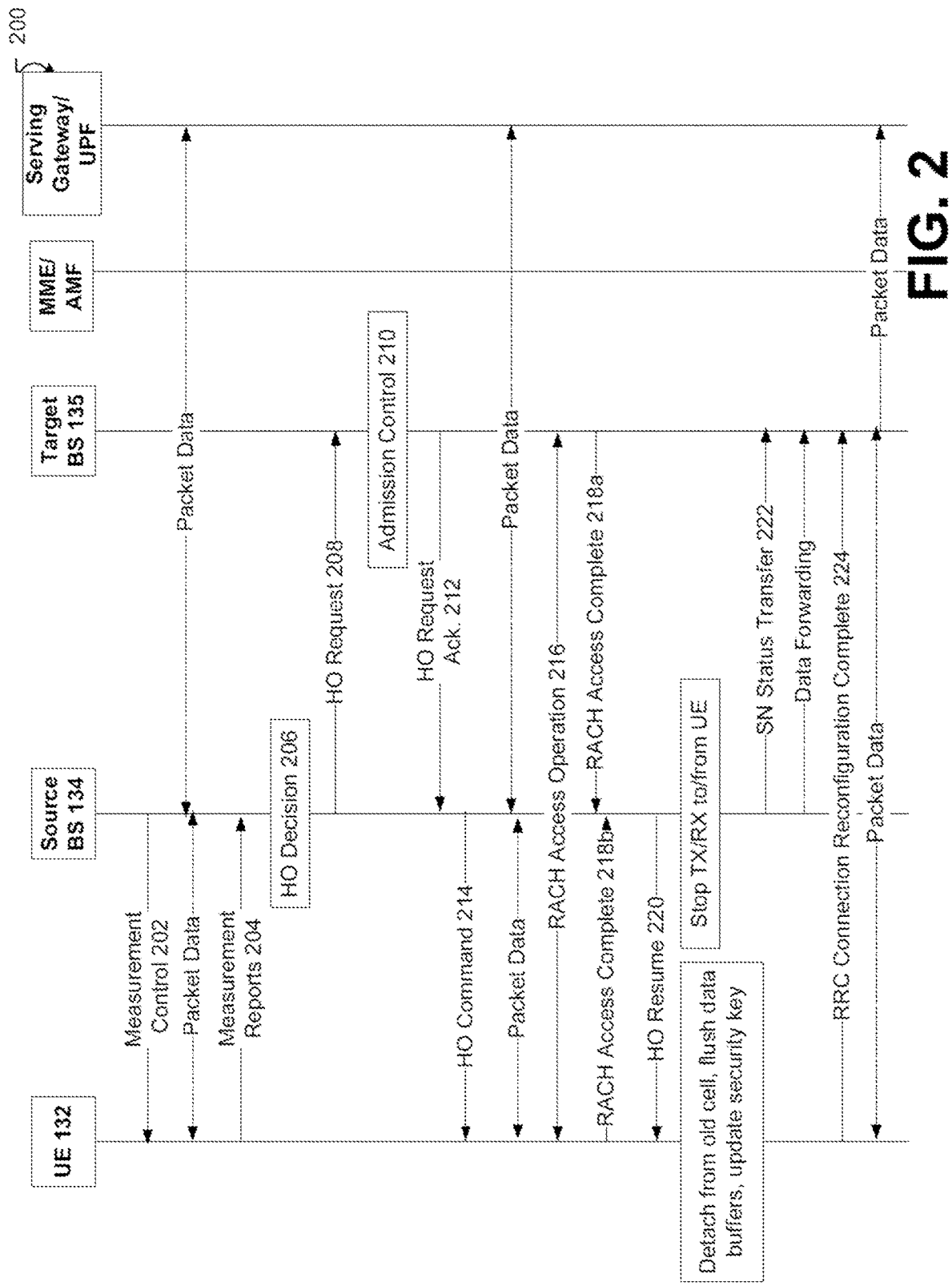
FIG. 2 is a sequence diagram illustrating a HO procedure using a HO resume message according to an example implementation.

FIG. 2 is a sequence diagram illustrating an example HO procedure 200 according to the improved techniques described herein. At 202, the source BS 134 performs a measurement control which induces the UE 132 to perform measurements of, for example, signal strength, etc., in the context of deciding whether the UE is in the correct cell. In the meantime, the source BS 134 and the UE 132 exchange packet data that the BS 134 receives from a Serving Gateway/UPF.

At 204, the UE 132 generates and sends a measurement report to the source BS 134. The measurement report indicates measurements of, for example, signal strength. At 206, the source BS 134 makes a decision regarding performing a HO with the target BA based on the measurements included in the measurement report.

At 208, in the case where the source BS decides to perform a HO operation, the source BS 134 sends a HO request to the target BS 135. After receiving the HO request, at 210 the target BS 135 performs an admission control operation to determine whether to serve the UE 132 in the cell 137. At 212, in the case where the target BS 135 admits the UE 132, the target BS 135 sends a HO request acknowledgment to the source BS 134.

At 214, the UE 132 receives the RRC Connection Reconfiguration message (typically called "Handover Command") which contains a special indication that the 2 TRX solution shall be initiated. Data transmission in the source cell will continue afterwards as normal. The UE 132 will perform random access procedure with the target cell. When this is completed, the source cell will be informed
  either by the target cell
  or by the UE via an appropriate message.

At this point, most of the time-critical handover related procedures have been exchanged, but no interruption has occurred at all. The source cell will send the handover resume message to the UE, start data forwarding to the target cell, and stop transmission.

The behavior of the UE after receiving the Handover Resume is identical to the behavior after receiving the Handover Command during RACH-less handover. It will
  detach from the source cell
  Flush its buffers (this massively simplifies the procedure against the "exactly 0ms" solutions, since it is very clear that all subsequent packets are using the security key of the target).
  Update the security key
  Send the RRC Connection Reconfiguration Complete message to the target. Similar to the "Handover Resume" message, this may also be simplified and accelerated by using a lower layer message. This would exploit the fact that not only the timing advance is available (as in the RACH-less handover), there could even be transmissions already with the target.

The final steps of the procedure are identical with the RACH-less handover illustrated in FIG. 1B.

With this approach at least the interruption of the existing RACH-less+MBB solutions can be achieved (but for any scenario, not only the restricted RACH-less scenarios). Furthermore, reviewing table 1 again, the following benefits are achieved:

No time is needed for RF/baseband re-tuning, since this works in parallel. Nonetheless, the time for security update still remains. So, step 9.2 of table 1 (UE processing time for RF/baseband re-tuning, security update) will be smaller than 5 ms, we have assumed ~2 ms.

Also, the RRC Connection Reconfiguration Complete message can be simplified, and transmitted faster, as discussed above.

Hence, in table 1 it is assumed that the interruption time can be further reduced from ~11 ms (RACH-less+MBB) to ~4 ms.

There is a number of potential improvements which can be applied (these are additional embodiments of the invention):

Mobility robustness can be improved by initiating the handover process earlier such that the HO Command is sent when the terminal still has a safe connection to the source cell. In order to avoid that the UE 132 ends up in the target cell too early (i.e. when it is not stable yet), the source cell may postpone the transmission of Handover Resume message.

The source BS 134 may configure an appropriate measurement reporting event, and send the Handover Resume only when receiving this report. Note that this is a vendor-specific implementation aspect of the invention.

Similar to MBB, the data transmission in the source cell can continue even after the resume message. This will lead to some uncertainties (similar to MBB), but it can further reduce the interruption time.

Sending RRC Connection Reconfiguration Complete/ RRC Connection Reconfiguration (Handover Resume) as a lower layer message.

Data forwarding may become a bottle neck, i.e. the UE 132 may complete the procedure before the target has received the packets. The source BS 134 can improve this by starting the forwarding earlier.

In order to further improve the robustness and reliability, instead of accessing the target via a simple RACH procedure, a split bearer following the Rel12 Dual Connectivity principle may be established. This is explained in more detail with respect to FIG. 3.

Normally, SCells are deactivated in handover during the HO execution. However, in this case the source eNB link is still operating while the target eNB link is being established, so the transmission and/or reception towards one or more SCells might be suspended (i.e. not used) during the course of the handover, and resumed after the source eNB is released. This would be relevant e.g. in case of DC as well, where UE is assumed to have 2TRX, but could apply also for other cases e.g. when PUCCH SCell is used. This embodiment may save one TRX since UE could "reuse" an SCell leg during handover while still allowing source link to continue.

In intra-frequency case, if both the source and target cells know the used PRACH preamble configuration (e.g. based on inspecting the HO Command created by the target cell which contains the RACH parameters for the UE, or direct X2 communication between source and target), the source cell could also try to receive the preamble and use that to determine when the RACH is completed and decide the resumption of the handover earlier.

Figure 3:
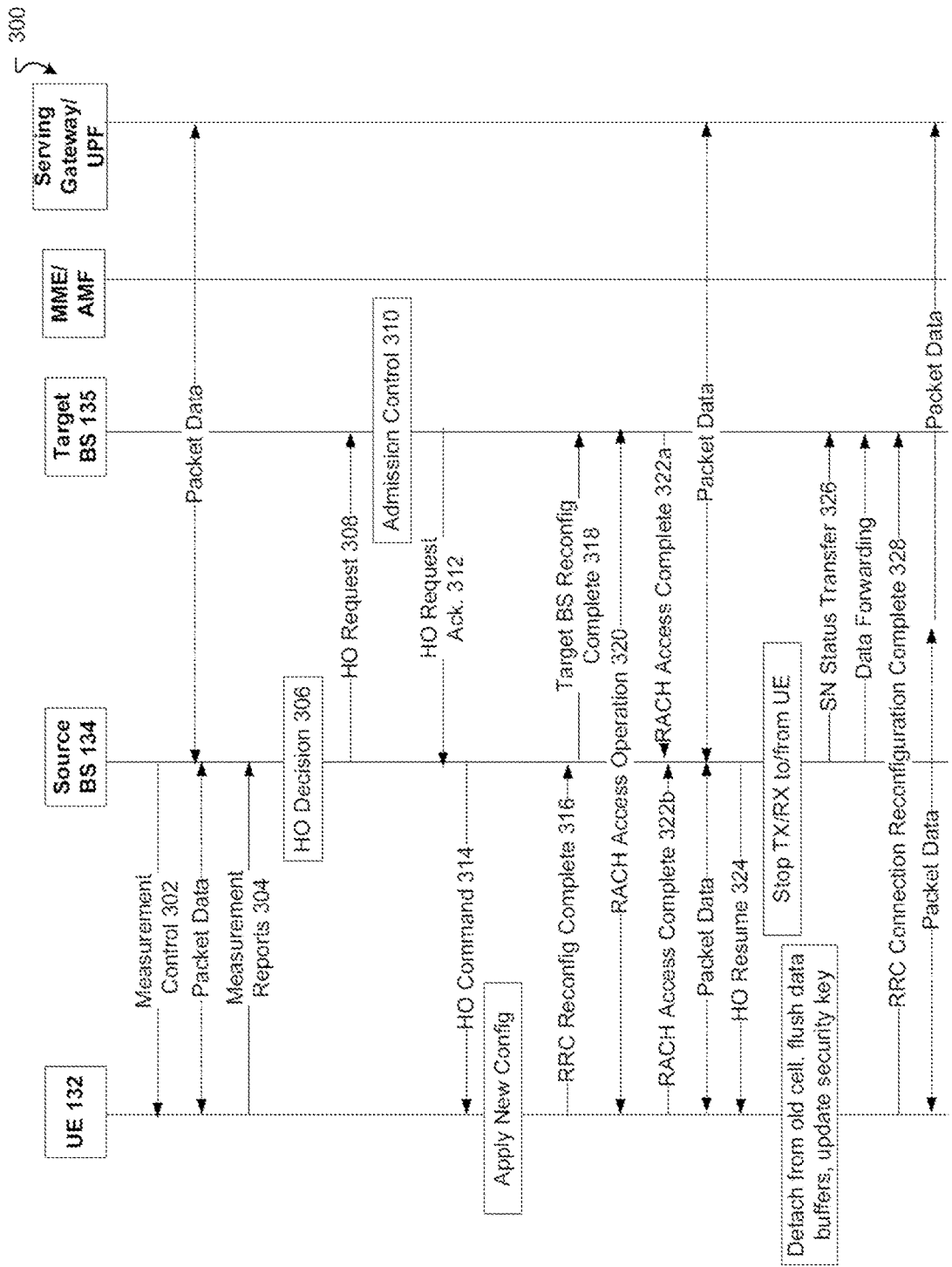
FIG. 3 is a sequence diagram illustrating a HO procedure using a HO resume message and at least one split bearer according to an example implementation.

FIG. 3 is a sequence diagram illustrating an example handover (HO) procedure 300 including split bearers. At 302, the source BS 134 performs a measurement control which induces the UE 132 to perform measurements of, for example, signal strength, etc., in the context of deciding whether the UE is in the correct cell. In the meantime, the source BS 134 and the UE 132 exchange packet data that the BS 134 receives from a Serving Gateway/UPF.

At 304, the UE 132 generates and sends a measurement report to the source BS 134. The measurement report indicates measurements of, for example, signal strength. At 306, the source BS 134 makes a decision regarding performing a HO with the target BS based on the measurements included in the measurement report.

At 308, in the case where the source BS decides to perform a HO operation, the source BS 134 sends a HO request to the target BS 135. After receiving the HO request, at 310 the target BS 135 performs an admission control operation to determine whether to serve the UE 132 in the cell 137. At 312, in the case where the target BS 135 admits the UE 132, the target BS 135 sends a HO request acknowledgment to the source BS 134.

At 314, the UE 132 receives the RRC Connection Reconfiguration which contains now additional information to set up the target as secondary cell group (SCG) and establish a split bearer. In contrast to the simple HO Command, this may be acknowledged. Note that 314 to 318 is the legacy procedure for establishing a split bearer. After the split bearer is up and running, the procedure continues as before:

Source is informed about the completion of the RACH access (by target cell or by UE)

Source sends Handover Resume

UE detaches from source cell, flushes the buffer, updates security keys and sends a complete message to the target.

The main advantages of this solution is that both data and signalling radio bearer (SRB) could be duplicated via source and target which has an extremely positive effect on mobility robustness. In particular, the Handover Resume message can be postponed to guarantee a stable target—data and control will still be safe when transmitted via both source and target.

Other advantages include:

Removal of the restrictions of RACH-less handover, it works in any scenario.

Removal of the uncertainty of the Rel-14 MBB.

Avoidance of the significant complexity of the solutions going even closer to 0ms, associated with 2 PDCPs and 2 security keys (enhanced MBB).

Allowance of simple extensions to increase robustness, exploiting the benefits of SRB duplication and data duplication (e.g. for ultra-reliability).

Figure 4:
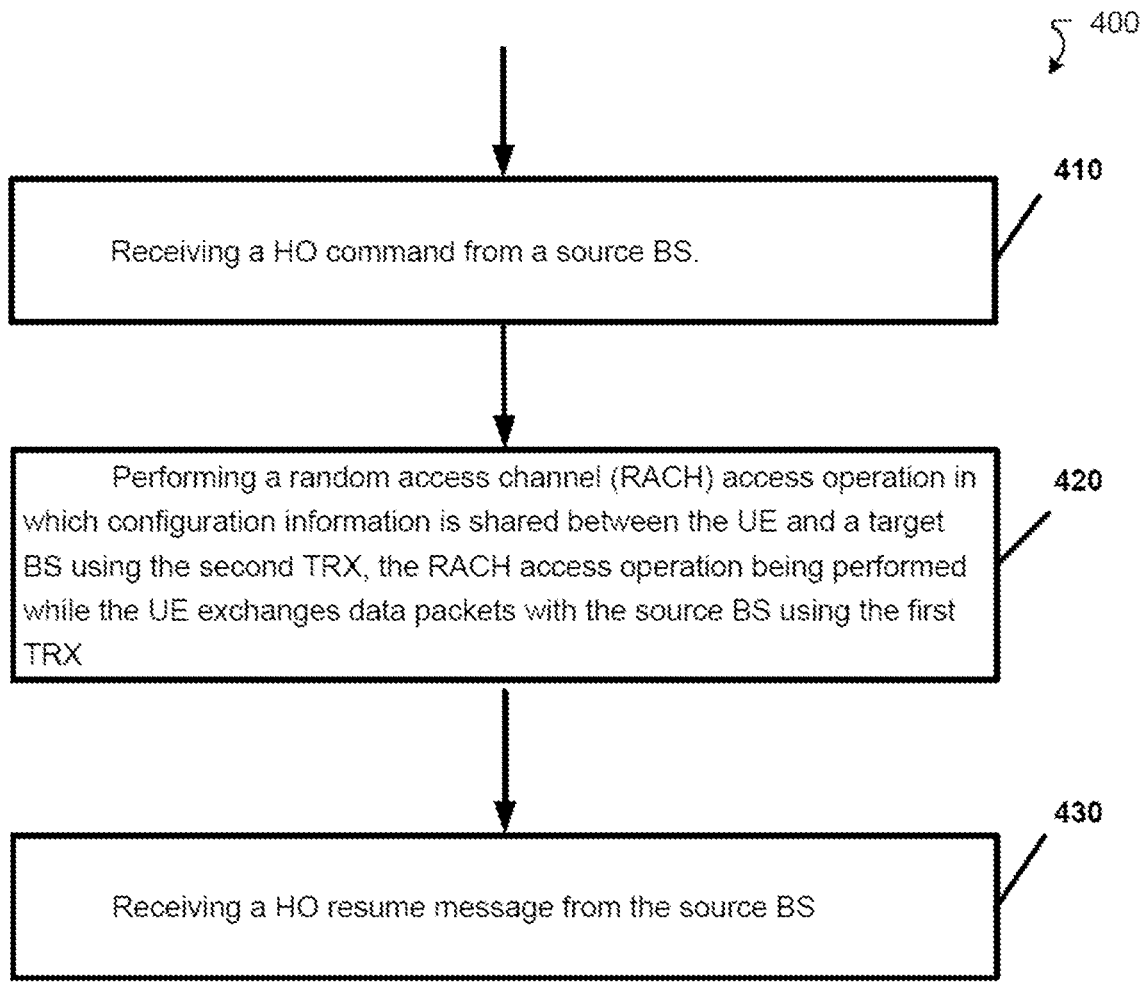
FIG. 4 is a flow chart illustrating a method of performing a HO according to an example implementation.

Example 1: FIG. 4 is a flow chart illustrating a method 400 of performing the improved techniques. Operation 410 includes receiving, by a user equipment (UE) having a first transceiver (TRX) and a second TRX, a HO command from a source base station (BS). Operation 420 includes, after receiving the HO command, performing, by the UE, a random access channel (RACH) access operation in which configuration information is shared between the UE and a target BS using the second TRX, the RACH access operation being performed while the UE exchanges data packets with the source BS using the first TRX. Operation 430 includes receiving a HO resume message from source BS.

Example 2: According to an example implementation of example 1, after receiving the HO resume message, performing a RACH-less HO operation to complete a HO to the target BS.

Example 3: According to an example implementation of example 2, after receiving the HO resume message and prior to performing the RACH-less HO operation, exchanging additional data packets with the source BS.

Example 4: According to an example implementation of example 1, wherein the HO command comprises an indication of RACH-less handover with two TRXs.

Example 5: According to an example implementation of example 5, wherein the HO command is received at a time when the UE has a safe connection to the source BS.

Example 6: According to an example implementation of example 5, wherein the HO resume message is postponed by the source BS for a time based on an amount of time that the UE has the safe connection to the BS.

Example 7: According to an example implementation of example 1, wherein the HO resume message is of a lower layer than an RRC/PDCP layer.

Example 8: According to an example implementation of example 7, wherein the HO resume message is a MAC Control Element of a MAC layer.

Example 9: wherein the HO resume message is sent on a physical downlink control channel (PDCCH).

Example 10: According to an example implementation of example 1, further comprising informing the source BS, by the user equipment, that the RACH access operation is completed.

Example 11: According to an example implementation of example 1, wherein performing the RACH-less HO operation includes performing a data forwarding operation to forward data to the target BS, the data forwarding operation being performed prior to a sequence number (SN) status transfer operation.

Example 12: According to an example implementation of example 1, wherein the HO command includes configuration information for configuring the target BS as a Secondary BS with a secondary cell group (SCG).

Example 13: According to an example implementation of example 12, wherein the method further comprises, prior to performing the RACH-less HO access operation, establishing at least one split bearer, the split bearer including a conduit, which enables downlink data and downlink control information being received, by the UE, from the source BS directly and/or indirectly via the conduit from the target BS, and/or uplink data and uplink control information being transmitted, by the UE, to the source BS directly and/or indirectly via the conduit from the target BS.

Figure 5:
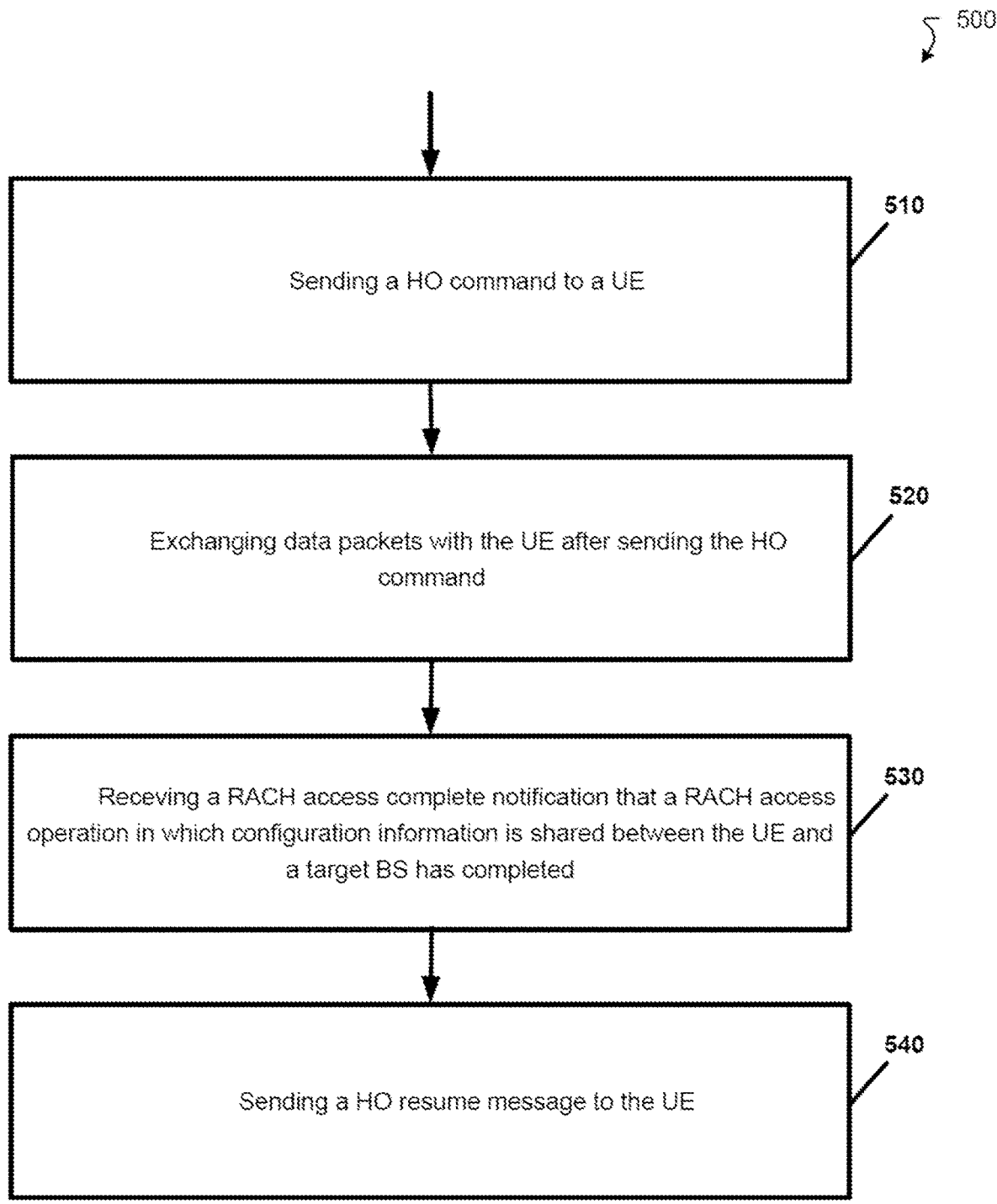
FIG. 5 is a flow chart illustrating a method of performing a HO according to another example implementation.

Example 14: FIG. 5 is a flow chart illustrating an example method 500 of performing the improved techniques. Operation 510 includes sending, by a source base station (BS), a HO command to a user equipment (UE). Operation 520 after sending the HO command, exchanging, by the source BS, data packets with the UE. Operation 530 includes after sending the HO command, receiving, by the source BS, a random access channel (RACH) access complete notification that a RACH access operation in which configuration information is shared between the UE and a target BS has completed, the RACH access operation having been performed by the UE after the UE receives the HO command Operation 540 includes, after receiving the RACH complete notification, sending, by the source BS, a HO resume message to the UE.

Example 15: According to an example implementation of example 14, further comprising after sending the HO resume message, exchanging additional data packets with the UE.

Example 16: According to an example implementation of example 15, wherein the HO resume message is sent by the source BS after the source BS receives a measurement report.

Further example implementations and/or example details will now be provided.

List of Example Abbreviations

Figure 6:
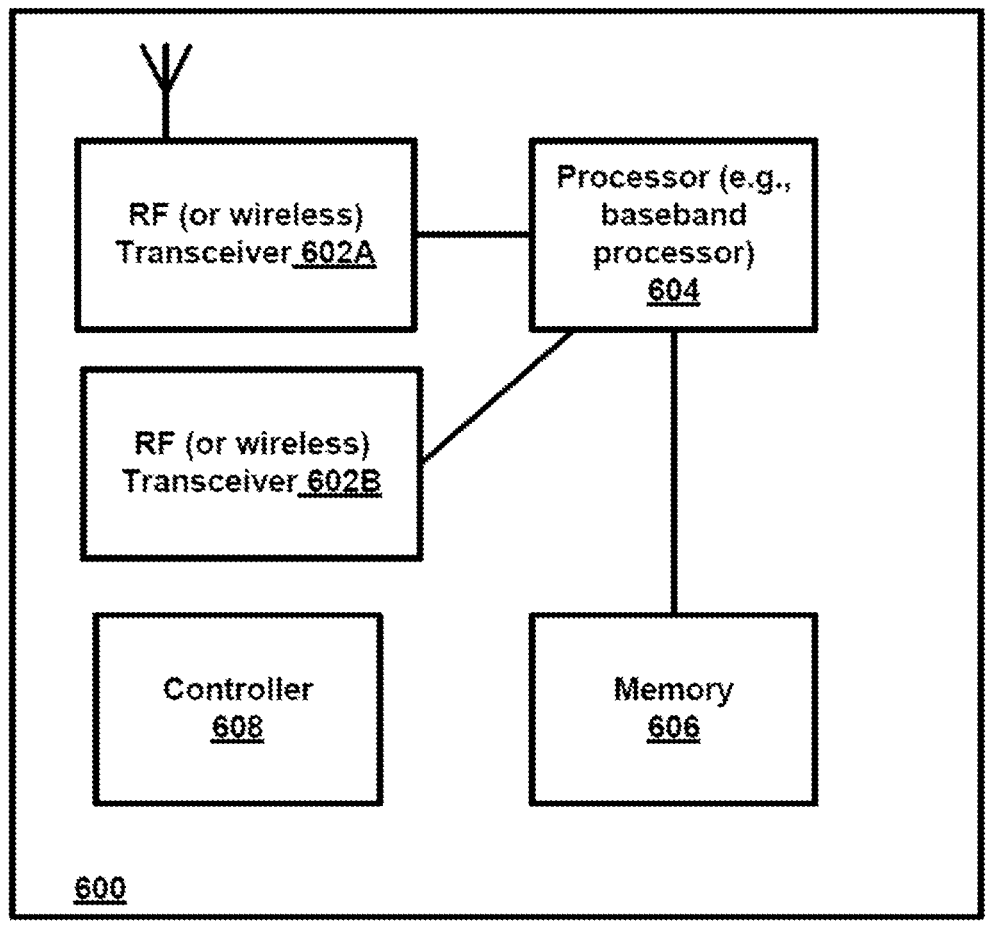
FIG. 6 is a block diagram of a node or wireless station (e.g., base station/access point, relay node, or mobile station/user device) according to an example implementation.

3GPP: third generation partnership project
4G: fourth generation of mobile telecommunication technology
5G: fifth generation of mobile telecommunication technology
5GMM: 5GS mobility management
5GS: 5G system
5GSM: 5GS session management
ACB: access class barring
AMF: access and mobility management function
CSFB: circuit switched fallback
DM: device management
DN: data network
DNN: data network name
EHPLMN: equivalent HPLMN
eMBB: enhanced mobile broadband
eNB: evolved Node B
EPS: evolved packet system
gNB: next generation Node B (uncertain)
HO Handover
HPLMN home PLMN
IMS: IP multimedia subsystem
IoT: internet of things
IP: internet protocol
MME: mobility management entity
MMTel: IMS multimedia telephony service
NAS: non-access stratum
NGAP: next generation application protocol
NSSAI: network slice selection assistance information
OAM: operations, administration, and management
OMA: open mobile alliance
OS: operating system
PCF: policy control function
PDCCH physical downlink control channel
PDU: protocol data unit
PLMN public land mobile network
RACH random access channel
RAN: radio access network
RRC: radio resource control
S-NSSAI: single NSSAI
SD: slice differentiator
SMS: short message service
SMSoNAS: SMS over NAS
SMSoIP: SMS over IP
SSAC: service specific access control
SST: slice/service type
UDM: user data management
UE: user equipment
UPF: user plane function
URLLC: ultra-reliable and low latency communication
VPLMN: visited PLMN FIG. 6 is a block diagram of a wireless station (e.g., AP, BS, eNB, UE or user device) 600 according to an example implementation. The wireless station 600 may include, for example, one or two RF (radio frequency) or wireless transceivers 602A, 602B, where each wireless transceiver includes a transmitter to transmit signals and a receiver to receive signals. The wireless station also includes a processor or control unit/entity (controller) 604 to execute instructions or software and control transmission and receptions of signals, and a memory 606 to store data and/or instructions.

Processor 604 may also make decisions or determinations, generate frames, packets or messages for transmission, decode received frames or messages for further processing, and other tasks or functions described herein. Processor 604, which may be a baseband processor, for example, may generate messages, packets, frames or other signals for transmission via wireless transceiver 602 (602A or 602B). Processor 904 may control transmission of signals or messages over a wireless network, and may control the reception of signals or messages, etc., via a wireless network (e.g., after being down-converted by wireless transceiver 602, for example). Processor 604 may be programmable and capable of executing software or other instructions stored in memory or on other computer media to perform the various tasks and functions described above, such as one or more of the tasks or methods described above. Processor 604 may be (or may include), for example, hardware, programmable logic, a programmable processor that executes software or firmware, and/or any combination of these. Using other terminology, processor 604 and transceiver 602 together may be considered as a wireless transmitter/receiver system, for example.

In addition, referring to FIG. 6, a controller (or processor) 608 may execute software and instructions, and may provide overall control for the station 600, and may provide control for other systems not shown in FIG. 6, such as controlling input/output devices (e.g., display, keypad), and/or may execute software for one or more applications that may be provided on wireless station 600, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 602A/602B may receive signals or data and/or transmit or send signals or data. Processor 604 (and possibly transceivers 602A/602B) may control the RF or wireless transceiver 602A or 602B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. A method, comprising:
receiving, by a user equipment having a first transceiver and a second transceiver, a handover command from a source base station;
after receiving the handover command, performing, by the user equipment, a random access channel access operation in which configuration information is shared between the user equipment and a target base station using the second transceiver, the random access channel access operation being performed while the user equipment exchanges data packets with the source base station using the first transceiver; and
after completing the performing of the random access channel access operation, receiving, by the user equipment, a handover resume message from the source base station.

2. The method as in claim 1, further comprising:
after receiving the handover resume message, performing a random access channel-less handover operation to complete a handover to the target base station.

3. The method as in claim 1, wherein the handover command comprises an indication of random access channel-less handover with two transceivers.

4. An apparatus, comprising:
at least one processor; and
at least one memory including computer program code;
the at least one memory and the computer program code configured to, with the at least one processor, cause the apparatus at least to:
receive a handover command from a source base station;
after reception of the handover command, perform a random access channel access operation in which configuration information is shared between the apparatus and a target base station using a second transceiver, the random access channel access operation being performed while the apparatus exchanges data packets with the source base station using a first transceiver; and
after completion of the performing of the random access channel access operation, receive a handover resume message from the source base station.

5. The apparatus as in claim 4, wherein the at least one memory and the computer program code are further configured to cause the apparatus at least to:
after reception of the handover resume message, perform a random access channel-less handover operation to complete a handover to the target base station.

6. The apparatus as in claim 5, wherein the at least one memory and the computer program code are further configured to cause the apparatus at least to:
after reception of the handover resume message and prior to performance of the random access channel-less handover operation, exchange additional data packets with the source base station.

7. The apparatus as in claim 4, wherein the handover command comprises an indication of random access channel-less handover with two transceivers.

8. The apparatus as in claim 4, wherein the handover command is received at a time when the apparatus has a safe connection to the source base station.

9. The apparatus as in claim 8, wherein the handover resume message is postponed by the source base station for a time based on an amount of time that the apparatus has the safe connection to the base station.

10. The apparatus as in claim 4, wherein the handover resume message is of a lower layer than a radio resource control/Packet Data Convergence Protocol layer.

11. The apparatus as in claim 10, wherein the handover resume message is of a medium access control layer.

12. The apparatus as in claim 10, wherein the handover resume message is sent on a physical downlink control channel.

13. The apparatus as in claim 4, wherein the at least one memory and the computer program code are further configured to cause the apparatus at least to:
 inform the source base station that the random access channel access operation is completed.

14. The apparatus as in claim 4, wherein the at least one memory and the computer program code configured to perform the random access channel-less handover operation are further configured to cause the apparatus at least to:
 perform a data forwarding operation to forward data to the target base station, the data forwarding operation being performed prior to a sequence number status transfer operation.

15. The apparatus as in claim 4, wherein the handover command includes configuration information for configuring the target base station as a secondary cell group.

16. The apparatus as in claim 15, wherein the at least one memory and the computer program code are further configured to cause the apparatus at least to, prior to performing the random access channel access operation:
 establish at least one split bearer, the split bearer including a conduit, which enables downlink data and downlink control information being received, by the apparatus, from the source base station directly and/or indirectly via the conduit from the target base station, and/or uplink data and uplink control information being transmitted, by the apparatus, to the source base station directly and/or indirectly via the conduit from the target base station.

17. An apparatus, comprising:
 at least one processor; and
 at least one memory including computer program code;
 the at least one memory and the computer program code configured to, with the at least one processor, cause the apparatus at least to:
  send a handover command to a user equipment;
  after sending the handover command, exchange data packets with the user equipment;
  after sending the handover command, receive a random access channel access complete notification that a random access channel access operation in which configuration information is shared between the user equipment and a target base station has completed, the random access channel access operation having been performed by the user equipment after the user equipment receives the handover command; and
  after reception of the random access channel complete notification, send a handover resume message to the user equipment.

18. The apparatus as in claim 17, wherein the at least one memory and the computer program code are further configured to cause the apparatus at least to:
 after sending the handover resume message, exchange additional data packets with the user equipment.

19. The apparatus as in claim 17, wherein the at least one memory and the computer program code are further configured to cause the apparatus at least to:
 receive an indication, from at least one of the user equipment or the target base station, that the random access channel access operation is completed.

20. The apparatus as in claim 17, wherein the handover resume message is sent by the apparatus after the apparatus receives a measurement report.

* * * * *